United States Patent
O'Toole, Jr.

(10) Patent No.: US 7,370,087 B1
(45) Date of Patent: May 6, 2008

(54) METHOD AND APPARATUS FOR PROVIDING ACCESS TO A PERIPHERAL DEVICE MANAGEMENT INTERFACE

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 913 days.

(21) Appl. No.: 10/357,650

(22) Filed: Feb. 4, 2003

(51) Int. Cl.
*G06F 15/16* (2006.01)

(52) U.S. Cl. .................. 709/217; 709/220; 709/225

(58) Field of Classification Search ........ 709/208–211, 709/217–229, 250
See application file for complete search history.

(56) References Cited

U.S. PATENT DOCUMENTS

| | | | |
|---|---|---|---|
| 6,092,078 A * | 7/2000 | Adolfsson | 707/102 |
| 6,199,099 B1 * | 3/2001 | Gershman et al. | 709/203 |
| 6,271,752 B1 * | 8/2001 | Vaios | 340/541 |
| 6,464,139 B1 * | 10/2002 | Wilz et al. | 235/462.01 |
| 6,480,889 B1 | 11/2002 | Saito et al. | 709/220 |
| 6,509,913 B2 * | 1/2003 | Martin et al. | 715/762 |
| 6,658,325 B2 * | 12/2003 | Zweig | 700/245 |
| 6,891,566 B2 * | 5/2005 | Marchese | 348/211.3 |
| 6,993,448 B2 * | 1/2006 | Tracy et al. | 702/119 |
| 7,266,601 B2 * | 9/2007 | Maekawa et al. | 709/224 |
| 7,272,641 B2 * | 9/2007 | Yamagishi | 709/218 |
| 2003/0014511 A1 * | 1/2003 | Maekawa et al. | 709/223 |
| 2004/0085900 A1 * | 5/2004 | Nishio | 370/230 |
| 2004/0098571 A1 * | 5/2004 | Falcon | 713/1 |
| 2005/0152287 A1 * | 7/2005 | Yokomitsu et al. | 370/255 |
| 2006/0161635 A1 * | 7/2006 | Lamkin et al. | 709/217 |

* cited by examiner

*Primary Examiner*—Nathan Flynn
*Assistant Examiner*—Mohammad Siddiqi
(74) *Attorney, Agent, or Firm*—BainwoodHuang

(57) ABSTRACT

Embodiments of the present invention provide mechanisms and techniques for providing access to a peripheral management interface, such as a Web-based graphical user interface (GUI) associated with a peripheral device. In order to access a GUI associated with a peripheral device, a user activates the peripheral device, such as by actuating a mechanical switch on the device or by transmitting a wireless signal, such as an infrared signal. Based on the activation, the peripheral device constructs a URL that allows the requesting user to access the GUI associated with peripheral device and transmits the URL to the user's computer. The user then executes the URL, using a web browser, and accesses the GUI associated with the peripheral device, without knowledge of the IP address for the peripheral device.

26 Claims, 7 Drawing Sheets

METHOD AND APPARATUS FOR PROVIDING ACCESS TO A PERIPHERAL DEVICE MANAGEMENT INTERFACE

BACKGROUND OF THE INVENTION

In general, a peripheral device is a computer device associated with a host computer (e.g., a personal computer or laptop computer) that does not form part of the essential host computer (e.g., is not a processor or memory). Certain peripheral devices, such as Internet or web cameras, wireless access points, cable modems, or printers, include user accessible management interfaces or graphical user interfaces (GUIs) that provide user access and control of the peripheral devices. For example, by activating the GUI associated with a peripheral device, a user can perform routine configuration and troubleshooting tasks on the device.

In the case where the user's computer and the peripheral device communicate through a network, such as a local area network (LAN), the user typically retrieves information relating to the identity and location of the peripheral device before the user, using a computer, accesses the GUI associated with the device. Conventionally, peripheral devices are configured with an Internet protocol (IP) address and a media access control address (MAC) address used to identify the peripheral device as a node on a network. In such a case, the user typically first retrieves the IP address associated with the peripheral device of interest and utilizes the IP address to rendezvous with the GUI. Conventional peripheral devices provide various methods or mechanisms by which the user retrieves the IP address of the peripheral device in order to access the associated GUI.

In one method, during peripheral device installation (e.g., Web camera installation within the user's domicile), the user physically labels the peripheral device with the host name or IP address assigned to the device. Such labeling can be in the form of an adhesive label having the IP address of the device or in the form of a written notation directly on the peripheral device itself. When the user needs to access the GUI associated with a particular peripheral device, the user locates and physically accesses the peripheral device to retrieve the IP address written on the device. Alternatively, the user records the IP address of the peripheral device into a notebook for future reference. When the user needs to access the GUI associated with the peripheral device, the user retrieves the IP address or a particular peripheral device from the notebook. In either case, the user then inputs the retrieved IP address into a web browser and accesses the web GUI associated with the peripheral device.

In certain peripheral devices, after accessing the GUI for the device, the user triggers an indicator on the device, using the GUI, to confirm the geographic location of the peripheral device. For example, the Aironet Base Station (Cisco, San Jose, Calif.), is a connection point, for a wireless network, between wireless devices and a wired network. The Base Station is configured with a "flash light" function that, when triggered, flashes a light or LED on and off. To access the "flash light" function, the user utilizes the Base Station's MAC address to access the GUI associated with the Base Station. The user then activates the "flash light" function through the GUI, thereby causing the light on the Base Station to flash. Such flashing allows the user to physically locate the Base Station in the network and, in the case where the network includes more than one Base Station, the flashing allows a user to confirm access to the GUI of a particular Base Station.

Other conventional peripheral devices provide user access the GUI associated with the device by broadcasting the MAC address and IP address of the device to the user. For example, prior to installation of the device, the user configures his computer with operating instructions (e.g., software program) that controls the operation of the device. After connecting the peripheral device to the computer, the user engages the power of the device (e.g., power cycles the device). The device, in turn, broadcast its IP address and MAC address for a particular period of time. The user's computer, configured with and using peripheral device operating instructions, receives the broadcast IP address and MAC address from the peripheral device. The user then enters the received IP address in a Web browser to access the GUI for the device. A peripheral device that operates in a similar manner is the Panasonic Network Camera, Model KX-HCM270 (Panasonic Consumer Electronics Company, Secaucus, N.J.).

SUMMARY

Conventional devices and methods of accessing a GUI associated with a networked peripheral device suffer from a variety of deficiencies.

For example, in some peripheral devices, as described above, a user physically labels the peripheral device with the host name or IP address assigned to the device. When a user wants to access a GUI associated with the peripheral device, the user physically accesses the peripheral device to retrieve the IP address written on the device. Such access to the peripheral device, however, can be difficult. For example, in the case where the peripheral device is a camera located within a relatively inaccessible location (e.g., a crawl space of the user's attic), the user may not be able to easily retrieve the IP address physically attached to the device. Furthermore, the written IP address on the peripheral device can fade over time, thereby causing further difficulties for the user. Also, in the case where the IP address of the device changes, the IP address information on the label can become outdated if the user fails to update the label.

Also as described above, in some peripheral devices a user records the IP address on the peripheral device in a notebook. However, the user can easily lose the notebook, or other written records, relating to a device's IP address. Furthermore, the notebook can be of little use in the case where a user has multiple peripheral devices attached to the computer and, when recording the IP address for each peripheral, did not record a location corresponding to each peripheral. For example, assume the user has multiple cameras attached to a computer and the user wants to access the GUI of one particular camera. If the user had recorded the IP address of each camera attached to the computer but had failed to record the accompanying location of each camera, the user then iteratively enters each camera's IP address into a Web browser until the user accesses the GUI for the particular camera. Such a process can be time consuming for the user. Also, in the case where the IP address of the device changes, the IP address information in the notebook can become outdated if the user fails to enter the updated address in the notebook.

In another example, the Aironet Base Station is a peripheral device configured with a "flash light" function that, when triggered, flashes a light or LED on and off. To access the "flash light" function, the user utilizes the Base Station's MAC address to access the GUI associated with the Base Station and then activates the "flash light" function through the GUI, thereby causing the light on the Base Station to flash and allowing the user to locate the device. The Base Station, however, however, requires that that user know the Base Station's MAC address before engaging the "flash light" function. In the case where the user has not recorded the Base Station's MAC address into a notebook, the user may have to physically access the Base Station to retrieve the MAC address for the Base Station itself. Again, such a process can be time consuming for the user.

In another example, as described above, conventional peripheral devices, similar to the Panasonic Network Camera, allows a user to access the GUI associated with the device by broadcasting the MAC address and IP address of the camera to the user. To initiate broadcast of the MAC and IP addresses associated with such a peripheral device, the user power cycles the device. The user's computer, configured with the peripheral device operating instructions, receives the broadcast IP address and MAC address from the device. The user then enters the received IP address in a Web browser to access the GUI for the peripheral device.

The peripheral device, however, has several drawbacks with respect to user GUI access. While the device transmits the IP address associated with the camera, the user must input the address into his browser, effectively creating a uniform resource locator (URL), in order to access the GUI associated with the camera. Such a requirement adds to the effort on the user's end when attempting to access the GUI. Furthermore, in order to receive the broadcast from the device, the users' computer must be configured with instructions (e.g., software) specific to the device that allow for reception of the broadcast. In the case where the user replaces the computer and does not have access to the device's operating instructions (e.g., cannot configure his computer to interact with the peripheral device) the user cannot receive the broadcast IP address from the device. Additionally, in order to initiate broadcast of the IP address from the device, the user must physically power cycle the device. Such power cycling requires direct physical access to the device that, a described above, in a relatively inaccessible location, can be difficult for the user.

Embodiments of the present invention significantly overcome such deficiencies and provide mechanisms for providing access to a peripheral management interface, such as a Web-based GUI associated with a peripheral device. In order to access a GUI associated with a peripheral device, a user activates the peripheral device, such as by actuating a mechanical switch on the device or by transmitting a wireless signal, such as an infrared signal. Based on the activation, the peripheral device constructs a URL that allows the requesting user to access the GUI associated with peripheral device and transmits the URL to the user's computer. Transmission of the URL provides user flexibility in accessing the GUI. In one arrangement, for example, the peripheral device transmits the URL as hyperlink text, thereby minimizing effort on the part of the user in accessing the GUI. The user executes the URL, using a web browser, and accesses the GUI associated with the peripheral device, without knowledge of the IP address for the peripheral device.

In one arrangement, the invention relates to a method for providing access to a management interface associated with the peripheral device. In the method, a peripheral device receives a non-web based activation stimulus from an activation source through an activation interface and prepares a device message in response to receiving the activation stimulus. The device message has a peripheral device identifier and a resource locator that provides access to the management interface associated with the peripheral device. The peripheral device transmits the device message to a receiver where the resource locator of the device message provides access to the management interface associated with the peripheral device. By transmitting the device message to the receiver, the peripheral device provides user access to the management interface or GUI associated with the peripheral device without the user having knowledge of the name or IP address of the peripheral device.

In another arrangement, the resource locator has an identification component indicating the identity of the activation source for the activation stimulus. In the case where multiple users in a system simultaneously attempt to access the management interfaces for multiple peripheral devices in the system, each activated peripheral device transmits a device message, corresponding to each respective activation stimulus, to each user in the system. The identification component allows an activation source user to confirm a particular received device message as corresponding to his particular transmitted activation stimulus.

In another arrangement, the peripheral device generates a confirmation component in response to receiving the activation stimulus. The confirmation component allows verification of an access request for the management interface. When preparing the device message having the resource locator that provides access to the management interface, the peripheral device includes the generated confirmation component within the resource locator. The confirmation component acts as a password (e.g., provides security) for a user to access the management interface of the peripheral device.

In another arrangement, after transmitting the resource locator having the confirmation component, the peripheral device receives an access request for the management interface, the access request having the confirmation component and compares the received confirmation component with the generated confirmation component. The peripheral device provides access to the management interface based upon a correspondence between the received confirmation component and the generated confirmation component. The correspondence between the received confirmation component and the generated confirmation component verifies a requesting user's authorization to access the management interface.

In another arrangement, when receiving the activation stimulus, the peripheral device receives the activation stimulus through a wireless signal provided by a wireless signal transmitter where the wireless signal has a destination locator associated with a receiver. The peripheral device then posts the device message at destination locator of the receiver. Such posting (e.g., such as through an HTTP-post procedure) limits unauthorized users from accessing the management interface of the peripheral device.

In another arrangement, when receiving the activation stimulus, the peripheral device receives the activation stimulus through a wireless signal provided by a wireless signal transmitter. The peripheral device then broadcasts the device message through the network to a receiver in communication with the network. In the case where the wireless signal transmitter is configured to transmit (e.g., not receive) wireless signals, broadcast of the device message through the network allows a user of the wireless signal transmitter to retrieve the device message.

In another arrangement, when receiving the activation stimulus, the peripheral device receives the activation stimulus through a wireless signal provided by a wireless signal transmitter. The peripheral device then transmits the device message as a wireless signal to the wireless signal transmitter. In the case where the wireless signal transmitter is configured to both transmit and receive wireless signals, wireless transmission of the device message allows a user of the wireless signal transmitter to directly retrieve the device message (e.g., through the transmitter device) and access the management interface.

Other embodiments of the invention include a computer system, such as a data communications device, computerized device, or other device configured with software and/or circuitry to process and perform all of the method operations noted above and disclosed herein as embodiments of the invention. In such embodiments, the device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with an peripheral access application that when performed on the processor, produces an peripheral access process that causes the computer system to perform any and/or all of the method embodiments, steps and operations explained herein as embodiments of the invention. In other words, a computer that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a peripheral access application, such as a peripheral device operating system configured with a peripheral access manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a peripheral device apparatus. It is to be understood that the system of the invention can be embodied strictly as a software program, as software and hardware, or as hardware and/or circuitry alone. The features of the invention, as explained herein, may be employed in peripheral devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Embodiments of the present invention provide mechanisms for providing access to a peripheral management interface, such as a Web-based GUI associated with a peripheral device. In order to access the GUI associated with a peripheral device, a user activates the peripheral device, such as by actuating a mechanical switch on the device or by transmitting a wireless signal, such as an infrared signal, without knowing the IP address of the peripheral device. Based on the activation, the peripheral device constructs a URL that allows the requesting user to access the GUI associated with peripheral device and transmits the URL to the user's computer. Transmission of the URL provides user flexibility in accessing the GUI. In one arrangement, for example, the peripheral device transmits the URL as hyperlink text, thereby minimizing effort on the part of the user in accessing the GUI. The user then executes the URL, using a web browser, and accesses the GUI associated with the peripheral device, without knowledge of the IP address for the peripheral device.

Figure 1:
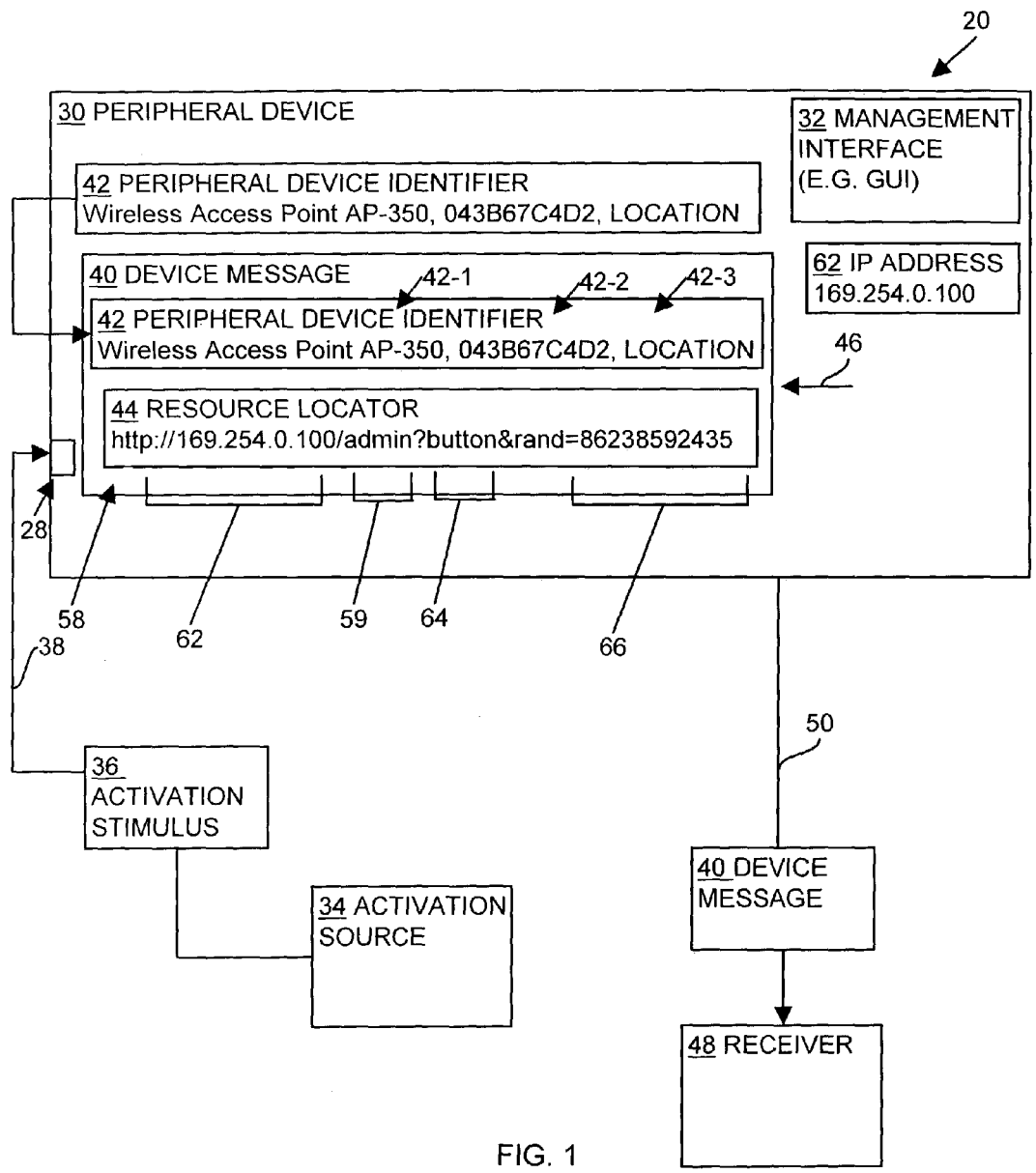
FIG. 1 is a block diagram of a computer system, configured according to one embodiment of the invention.

FIG. 1 illustrates a computer system 20, according to one embodiment of the invention. The computer system 20 includes a peripheral device 30, an activation source 34, and a receiver 48.

The peripheral device 30, in one arrangement, is a remote device, such as a printer or Web camera, that is separate from a host computer but is configured to communicate and operate under direction of the host computer. As shown, the peripheral device 30 has a device identifier 42 that provides an identification or identity of the peripheral device 30 with respect to the host computer. For example, when a user connects the peripheral device 30 to a network having multiple peripheral devices 30, the device identifier 42 allows the user to locate or identify a particular peripheral device 30 on the network. In one arrangement, the device identifier 42 is a text string having a model name 42-1 and a media access control (MAC) address 42-2 associated with the peripheral device 30. The model name 42-1 identifies a particular type of peripheral device 30 in communication with a computer. The MAC address 42-2 is a hardware address for the peripheral device 30 that identifies the peripheral device 30 as a node on a network, such as a LAN.

In another arrangement, the device identifier 42 includes location information 43-3 that identifies a geographic location of the peripheral device 30 relative to the user.

The peripheral device 30 also has an IP address 62 that acts as an identifier for the device 30 on a network. The IP address allows a user, utilizing a computer associated with the peripheral device 30, to initiate a communications session with the device 30, thereby allowing for transmission and reception of data between the computer and the device 30.

The peripheral device 30 also has a management interface 32, such as a GUI. In one arrangement the GUI 32 is a web-based GUI, accessible through a web browser. The management interface 32 allows a user to configure settings associated with the peripheral device 30 or to troubleshoot problems encountered with the peripheral device 30. For example, in case where the peripheral device 30 is a web camera, the user accesses the management interface 32 of the camera 30 to control the positioning of the camera 30 relative to a desired target.

The peripheral device 30 also has an activation interface 28 (e.g., a physical activation interface) that, when activated, initiates a process for creation and transmission of a device message 40. In one arrangement, for example, the activation interface 28 is a mechanical interface, such as a switch or button. In another arrangement, the activation interface 28 is a wireless signal interface (e.g., wireless signal transponder) that provides for reception and transmission of wireless signals. In the case where the activation interface 28 is a wireless signal interface, the wireless signal interface uses Zigbee 802.15.4 or Bluetooth 802.15.1 as the wireless communication protocol, for example. Alternately, the wireless signal interface transmits infrared (IR) signals as wireless signals. Use of the Bluetooth 802.15.1 wireless communication protocol or IR signal transmission, in one arrangement, provides signals over a limited geographic range (e.g., provides the device message 40 to a user or activation source 34 within relatively close proximity to the peripheral device 30. In yet another arrangement, the activation interface is an electronic interface that receives electronic signals as activation for the process for creation of a device message 40.

An activation source 34 communicates with the peripheral device 30 through the activation interface 28. The activation source 34 engages such communication without knowledge of the IP address of the peripheral device 30 (e.g., using a non-web based activation stimulus 36). In one arrangement, in the case where the activation interface 28 is a mechanical interface, the activation source 34 is an actuating device, such as a pen, pencil, or broom handle, that physically actuates the activation interface 28. In another arrangement, in the case where the activation interface 28 is a wireless signal interface, such as an infrared (IR) receiver, the activation source 34 is a wireless signal transmitter, such as an infrared (IR) signal transmitter, a remote control device, light emitting diode (LED), infrared transponder associated with a computer, or personal digital assistant (PDA). In another arrangement, the activation source 34 is a two-way infrared signal transponder that both transmits and receives wireless signals to and from the peripheral device 30, respectively.

The receiver 48 is a computerized device, such as a personal computer (e.g., host computer) or PDA, in communication with the peripheral device 30. In one arrangement, the receiver 48 is unique with respect to the activation source 34. For example, the receiver 48 receives the device message 40 from the peripheral device 30 after a separate activation source 34 transmits an activation stimulus 36. In another arrangement, the receiver 48 and the activation source 34 are contained within the same device. For example, a user can activate the peripheral device 30 using a PDA (e.g., PDA acts as the activation source 34) and receive access to the management interface 32 through the PDA (e.g., PDA acts as the receiver 48).

Figure 2:
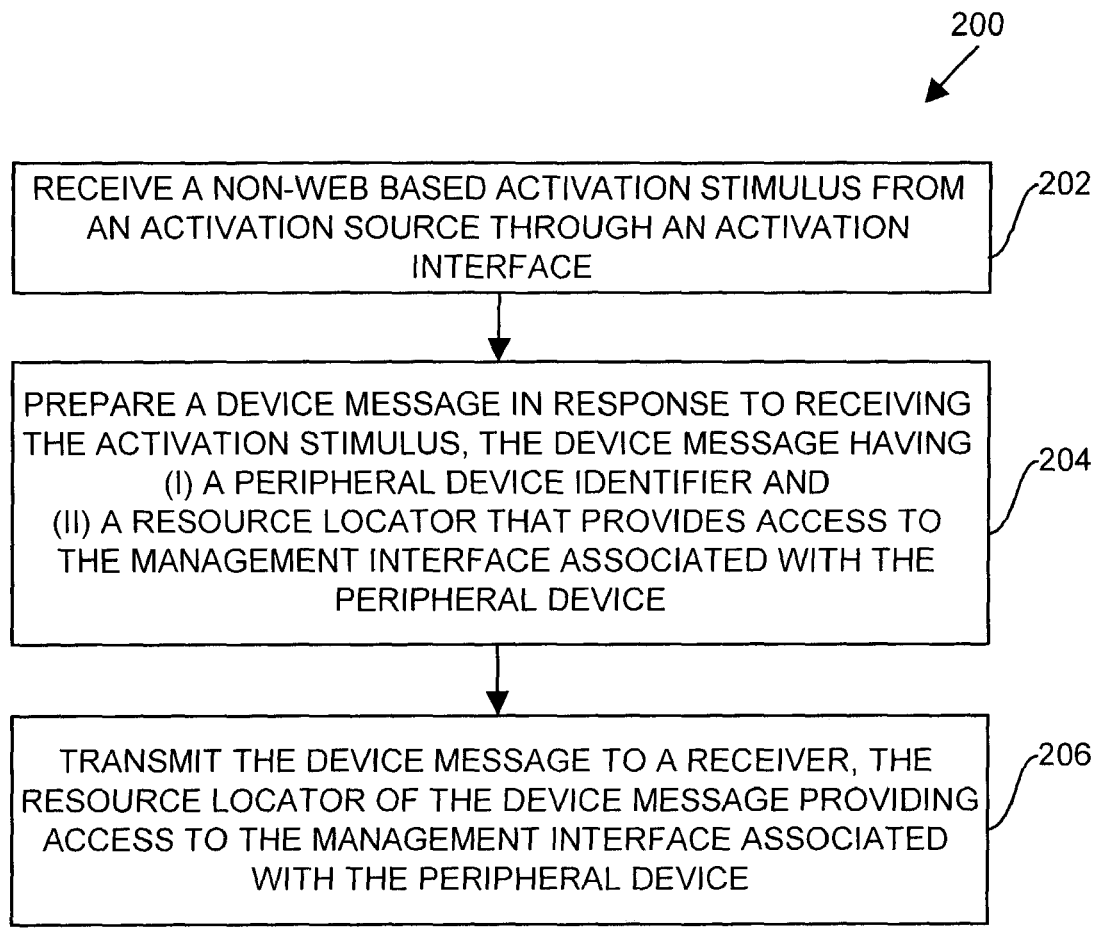
FIG. 2 is a flowchart of a procedure performed by the peripheral device of FIG. 1, configured according to one embodiment of the invention.

FIG. 2 illustrates a flowchart showing a method 200 performed by the peripheral device 30 of the computer system 20, according to one embodiment of the invention. In the method 200, the peripheral device 30 provides access to the management interface 32 associated with the peripheral device 30.

In step 202, the peripheral device 30 receives 38 a non-web based activation stimulus 36 from the activation source 34 through an activation interface 28. As described, the activation interface 28 is either a mechanical interface or a wireless interface. When the activation interface 28 is a mechanical interface, the activation source 34 (e.g., actuating device) transmits the activation stimulus 36 by applying the actuating device 34 to the activation interface 28 (e.g., actuating the mechanical interface). When the activation interface 28 is a wireless signal interface (e.g., IR receiver), the activation source 34 (e.g., IR transmitter) transmits the activation stimulus 36 in the form of a wireless signal produced by the activation source 34. The activation interface 28 allows the activation source 34 to transmit the activation stimulus 36 to the peripheral device 30 without knowledge of the IP address of the peripheral device 30 (e.g., the activation source 34 is not required to connect to the peripheral device 30 using an HTTP connection request, for example).

In step 204, the peripheral device prepares 46 a device message 40 in response to receiving 38 the activation stimulus 36. The device message 40 has a peripheral device identifier 42 and a resource locator 44 that provides access to the management interface 32 associated with the peripheral device 30.

As will be described in detail below, device identifier 42 allows a receiver 48 or receiving user to identify the source of the device message 40. Also as described in detail below, the resource locator 44 is a uniform resource locator (URL) that provides, to a user or receiver 48, access the management interface or GUI 32 associated with the peripheral device 30.

In step 206, peripheral device 30 transmits 50 the device message 40 to the receiver 48. The resource locator 44 of the device message 40 provides access to the management interface 32 associated with the peripheral device 30.

In one arrangement, the peripheral device identifier 42 forms a text portion of the device message 40. The device identifier 42 allows a receiver 48 or receiving user to identify the source of the device message 40 (e.g., the peripheral device 30 transmitting the device message 40). As described above, the device identifier 42 includes model number information 42-1 and MAC address information 42-2 associated with the peripheral device 30. For example, as shown FIG. 1, the model number 42-1 of the peripheral device 30 is "Wireless Access Point AP-350" and the MAC address 42-2 of the peripheral device 30 is 043B0B67C4D2.

The resource locator 44, in one arrangement, is a uniform resource locator (URL) and provides, to a user or receiver 48, the IP address 62 of the management interface or GUI 32 associated with the peripheral device 30. When the peripheral device 30 constructs the resource locator 44 relating to the associated GUI 32, the peripheral device 30 includes within the resource locator 44 a protocol portion 58 and the IP address 62 of the peripheral device 30. The protocol portion 58 indicates the transfer protocol used by the receiving user to access the management interface 32. For example, as illustrated in FIG. 1, the transfer protocol is an HTTP protocol. The IP address 62, as described above, allows a user, utilizing a computer associated with the peripheral device 30, to initiate a communications session with the device 30. For example, as illustrated in FIG. 1, the IP address of the peripheral device 30 is 169.254.0.100.

In another arrangement, when the peripheral device 30 constructs the resource locator 44, the peripheral device 30 includes additional portions or strings 59 within the resource locator 44, as necessary or needed by user, to access or invoke the GUI 32 of the peripheral device 30. For example, as illustrated in FIG. 1, the peripheral device 30 adds the string 59 "/admin" to the resource locator 44.

In another arrangement, when constructing the device message 30, the peripheral device 30 includes an identification component 64 within the resource locator 44 to indicate the identity of the activation source 34 for the activation stimulus 36. For example, assume that the activation interface 28 of the peripheral device 30 is a mechanical interface. When a user actuates the interface 28, the peripheral device 30 includes, 64 within the constructed resource locator 44, an identification component that indicates mechanical activation of the interface 28. When the actuating user receives the device message 40, the user can review the identification component portion 64 of the resource locator 44 to confirm the validity of the received resource locator 44 (e.g., that the user has received the device message 40 corresponding to his particular activation stimulus).

In another arrangement, when constructing the device message 40, the peripheral device 30 includes a confirmation component 66 within the resource locator 44. For example, the peripheral device 30 generates the confirmation component 66 as a unique, random string for each activation stimulus 36 the peripheral device 30 receives. By including the confirmation component 66 within the device message 40, the peripheral device 30 provides a level of security with respect to user access of the management interface 32. For example, in one arrangement, the peripheral device 30 provides user access to the management interface 32 only if the user presents a code or confirmation component 66 that corresponds to the confirmation component 66 generated and transmitted by the peripheral device 30. In another arrangement, use of the confirmation component 66 limits potential user "lockout" from the peripheral device 30. For example, assume a conventional peripheral device 30 requires the user to present a preset password to access the management interface 32. In the case where the user misplaces or forgets the preset password, the user cannot easily gain access to the management interface 32 (e.g., is "locked out" from interface access). In the present case, by randomly generating a confirmation component 66 for each received activation stimulus 36, the peripheral device 66 allows a user to access the management interface 32 based upon a unique password e.g., the particular confirmation component 66), thereby minimizing potential user "lockout" caused by a missing or forgotten password.

In one arrangement, the peripheral device 30 transmits 50 the device message 40 to the receiver 48 as a network broadcast, such as a LAN broadcast. For example, assume the LAN includes several receivers 48 or computer devices that communicate with the peripheral 30 through the LAN. In such a case, during transmission of the device message 40, all receivers 48 on the LAN receive the device message 40.

In another arrangement, the peripheral device 30 transmits 50 the device message 40 to the receiver 48 as a wireless signal. For example, the peripheral device 30 transmits the device message 40 as an IR signal utilizing a standard link-layer protocol, such as a consumer-grade IR link protocol. In such a case, a receiver 48 having IR reception capabilities, such as a computer having an IR receiver or a wireless activation source 34 configured as an IR transceiver, receive the device message 40 transmitted as the wireless (e.g., IR) signal.

In one arrangement, the transmission medium for the device message 40 depends upon the type of activation stimulus 36 received by the peripheral device 30. As described above, the peripheral device 30 receives, through the activation interface 28, an activation stimulus 36 in the form of either a mechanical (e.g., physical) actuation or a wireless signal. In one arrangement, the mechanical and wireless activation of the activation interface 28 are coupled. Therefore, when the peripheral device 30 receives either type of activation stimulus 36, the peripheral device 30 transmits 50 the device message 40 to the receiver 48 as both a network broadcast and as a wireless transmission.

In another arrangement, in the case of wireless transmission 50, the peripheral device 30 formats the device message transmission 50 to provide compatibility of the device message 40 with conventional file-transfer formats, such as desktop or PDA file-transfer formats. Such compatibility allows display of the device message 40 as a hypertext link that, when executed (e.g., "clicked on") by a user directs the user's computerized device to the GUI 32 of the peripheral device 30. For example, assume a receiver 48, such as a laptop or PDA, is configured (e.g., enabled) with IR file sharing. The peripheral device 30 transmits the device message 40 to the receiver 48 as a hypertext link or hyperlink associated with the management interface 32. When the user of the receiver 48 activates or clicks on the hyperlink, such activation directs the Web browser of the receiver 48 to the resource locator or URL 44 contained within the device message 40.

As described above, when constructing the device message 40, the peripheral device 30 includes a confirmation component 66 within the resource locator 44 of the device message 40. For example, the peripheral device 30 generates the confirmation component 66 as a unique, random string for each activation stimulus 36 the peripheral device 30 receives. By including the confirmation component 66 within the device message 40, the peripheral device 30 provides a level of security with respect to user access of the management interface 32. The confirmation component 66 allows the peripheral device 30 to verify a particular user or receiver 48 prior to providing the user or receiver 48 with access to the management interface 32.

Figure 3:
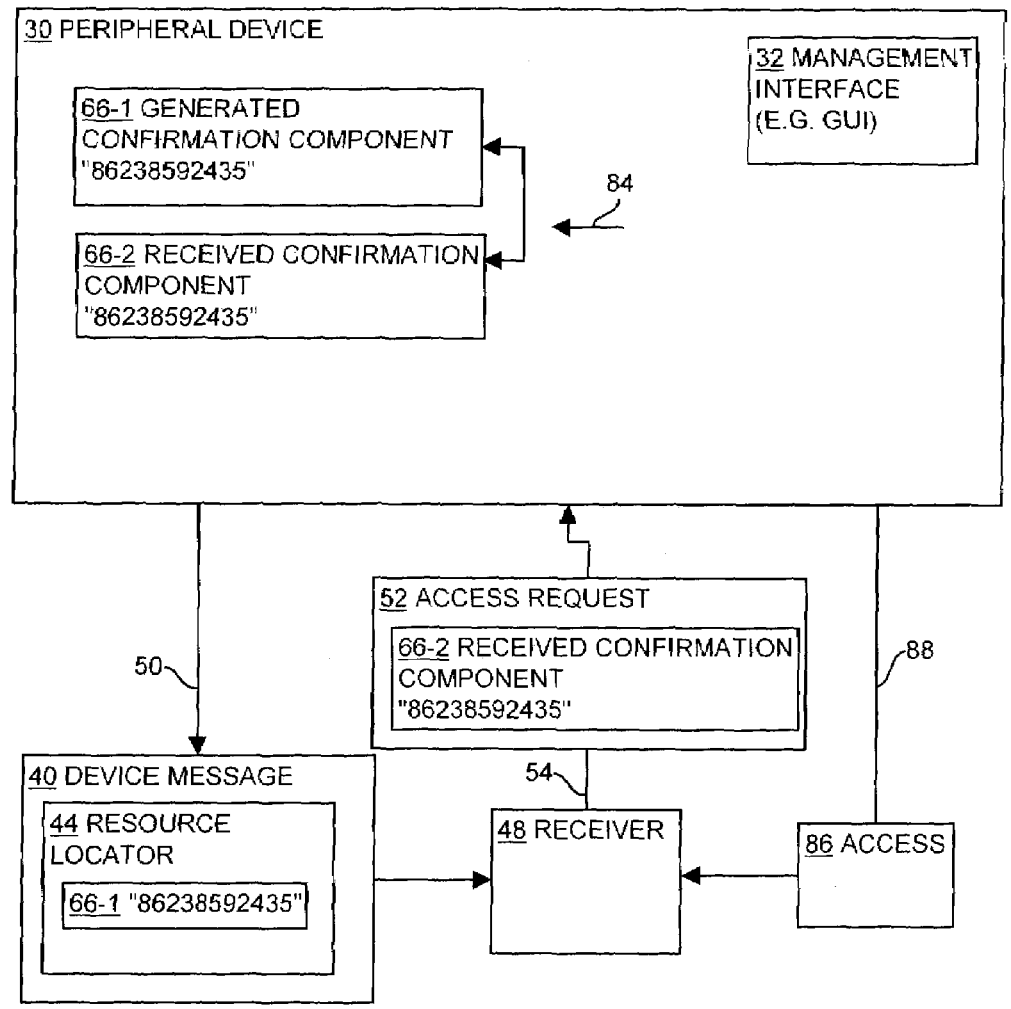
FIG. 3 is a block diagram of the computer system of FIG. 1, configured according to another embodiment of the invention.

FIG. 3 illustrates use of the confirmation code or confirmation component 66 by the peripheral device 30 in providing receiver 48 access to the management interface 32.

As described above, after receiving the activation stimulus 36 from the activation source 34, the peripheral device 30 prepares 46 the device message 40 having a resource locator (e.g., URL) 44 and a generated confirmation component 66-1. As shown FIG. 3, for example, the generated confirmation component 66-1 is the string "86238592435". The peripheral device 30 then transmits 50 the device message 40 to a receiver 48.

In response to receiving the device message 40 from the peripheral device 30, the receiver 48 transmits 54 an access request 52 to the peripheral device 30 to retrieve the management interface 32 associated with the peripheral device 30. In one arrangement, the receiver 48 transmits 54 the access request 52 by executing the resource locator 44 (e.g., clicking on a hypertext URL or entering the URL in a web browser associated with the receiver 48) provided by the peripheral device 30. The receiver 48 includes, within the access request 52, a received confirmation component 66-2 (e.g., the string "86238592435") to allow for verification, by the peripheral device 30, of the access request 52. In one arrangement, when the receiver 48 receives the device message 40, the receiver 48 detects the generated confirmation component 66-1 within the resource locator 44. When generating the access request 52, the receiver 48 places the generated confirmation component 66-1 within the access request 52 as the received confirmation component 66-2.

After the peripheral device 30 receives the access request 52, the peripheral device 30 compares 84 the received confirmation component 66-2 (e.g., "86238592435") with the generated confirmation component 66-1 (e.g., "86238592435"). In the case where the receiver 48 transmits 54 the access request 52 in response to receiving the device message 40 from the peripheral device 30, the peripheral device 30 detects the generated confirmation component 66-1 as being equivalent to the received confirmation component 66-2. Based upon the detected correspondence 84 between the received confirmation component 66-2 and the generated confirmation component 66-1, the peripheral device 30 provides 88 access 86 to the management interface 32. In one arrangement, such access 86 is in the form of launching a web-based GUT 32 on a web browser associated with the receiver 48.

In the case where the peripheral device 30 receives an access request 52 from a receiver 48 where the generated confirmation component 66-1 does not correspond to the received confirmation component 66-2, the peripheral device 30 denies user access to the management interface 32, thereby providing a level of security within the system 20 with respect to management interface access. For example, after creating the generated, confirmation component 66-1, the peripheral device 30 stores the generated confirmation component 66-1 within a storage location (e.g., memory) for a particular time duration. After expiration of the time duration, the peripheral device 30 removes the generated confirmation component 66-1 from the storage location. Assume a receiver 48 transmits an access request 52, having a received confirmation component 66-2, to the peripheral device 30 after the storage time duration has expired. Because the peripheral device 30 removed the generated confirmation component 66-1 from the storage location, a comparison 84 between the received confirmation component 66-2 and the generated confirmation component 66-2 does not produce a correspondence between the components 66-1, 66-2. In such a case, the peripheral device 30 does not provide access 88 to the management interface 32.

As described with respect to FIG. 1, the peripheral device 30 receives an activation stimulus 36 though either a mechanical actuation of the activation interface 28 or through reception of a wireless signal via the activation interface 28.

Figure 4:
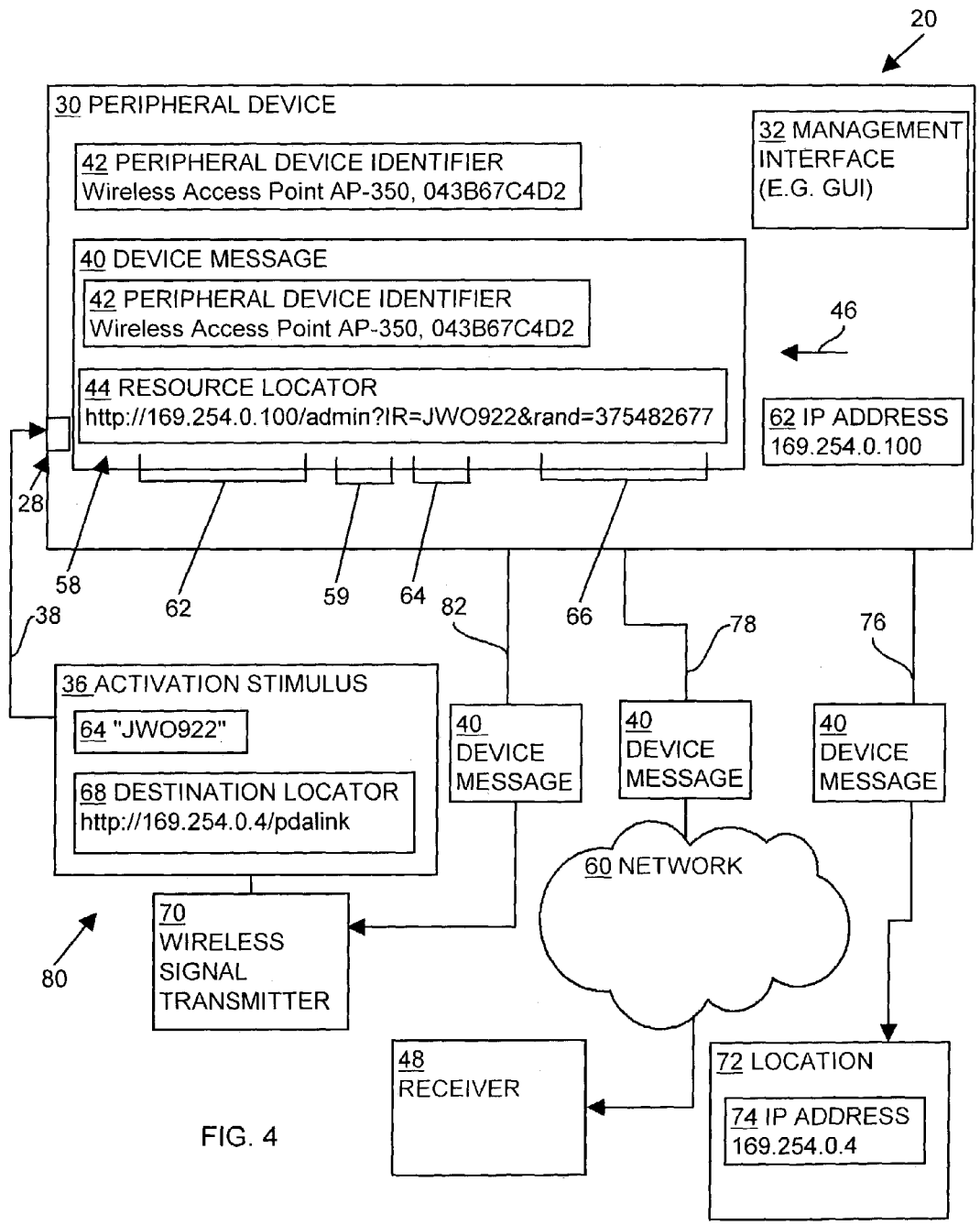
FIG. 4 is a block diagram of the computer system of FIG. 1, configured according to another embodiment of the invention.

FIG. 4 illustrates an arrangement of the computer system 20 where the peripheral device 30 receives 38 the activation stimulus 36 from a wireless signal transmitter 70, such as an IR signal transmitter. In one arrangement, the activation stimulus 36 includes an identification component 64, such as a string or code, that identifies the source (e.g., transmitter 70) of the activation stimulus 36. For example, assume that a user wants to access the management interface 32 of the peripheral device 30 using the wireless signal transmitter 70. The user enters the identification component 64 or code "JWO922", by way of example, into a keypad of the transmitter 70 to initiate transmission of the activation stimulus 36 to the peripheral device 30. The transmitted activation stimulus 36, in turn, includes the entered identification component 64. As described above, when the peripheral device 30 constructs the device message 40 in response to receiving the activation stimulus 36, the peripheral device 30 includes the identification component 64 within the resource locator 44. When the user or receiver 48 receives the device message 40 from the peripheral device 30, the user can review the identification component 64 (e.g., "JWO922") within the resource locator 44. Based upon the review, the user ensures that received device message 40 corresponds to the transmitted activation stimulus 36 originating from the user's wireless signal transmitter 70.

As described above, upon reception of the activation stimulus 36, the peripheral device 30 both broadcasts 78 the device message 40 over the network 60 and transmits 82 the device message 40 as a wireless signal, such as an IR signal, to a wireless signal receiver. In one arrangement, the wireless signal transmitter 70 is a wireless transmit-capable device that allows for wireless signal transmission only and does not receive wireless signals transmitted from the peripheral device 30. In such an arrangement, when a user transmits the activation stimulus 36 via the transmit-capable device 70, the user obtains the resulting device message 40 from the peripheral device 30 using a listening agent, such as the receiver 48, associated with the peripheral device 30. When the peripheral device 30 broadcasts 78 the device message 40 over the network 60, as initiated by the wireless signal transmitter 70, the receiver 48 receives the message 40 through the network 60. The user then accesses the management interface 32 associated with the peripheral device 30 by using the receiver 48 to execute the resource locator 44 (e.g., clicking or engaging a hypertext link) provided in the device message 40.

In another arrangement, the wireless signal transmitter 70 is a receive-capable device that allows for both transmission and reception of wireless signals to and from the peripheral device 30, respectively. In this arrangement, when a user transmits the activation stimulus 36 via the wireless signal transmitter 70, the wireless signal transmitter 70 receives the resulting device message 40 from the peripheral device 30 as a wireless signal transmission. The user then accesses the management interface 32 associated with the peripheral device 30 by using the wireless signal transmitter 70 to execute the resource locator 44 (e.g., clicking or engaging a hypertext link) provided in the device message 40.

In another arrangement, the wireless signal transmitter 70, for example a PDA, transmits a destination locator 68 to the peripheral device 30 as part of the activation stimulus 36. The destination locator 68 indicates to the peripheral device 30 a particular location 72 where the peripheral device 30 is to transmit or post the device message 40, such as through an HTTP-posting procedure, in response to receiving the activation stimulus 36.

For example, as shown FIG. 4, the destination locator 68 is a URL "http://169.254.0.4/pdalink". The destination locator 68 instructs the peripheral device 30 to post the device message 40 at the location 72 (e.g., computerized device)

associated with the IP address 74 "169.254.0.4". In response to receiving the activation stimulus 36 having the destination locator 68, the peripheral device 30 transmits 76 or posts the device message 40 to the location 72 associated with the IP address 74 of the destination locator 68.

In one arrangement, transmission of the destination locator 68 to the peripheral device 30, by the wireless signal transmitter 70, disables the peripheral device 30 from broadcasting the resulting device message 40 through the network 60. By disabling the network broadcast of the device message, the peripheral device 30 provides security to the device message 40 and limits access to the device message 40 (e.g., minimizes unauthorized users from accessing the management interface 32 of the peripheral device 30). For example, the URL associated with the destination locator 68 can be accessible to a single user (e.g., transmitting user of the destination locator), thereby allowing the single user access to the associated management interface.

In another arrangement, the location 72 is configured with an email-relay web site and with an email address associated with the user activating the wireless signal transmitter 70. Upon reception of the device message 40 from the peripheral device, via the posting procedure (e.g., as an HTTP-post), the email-relay website converts the device message 40 into an email message directed to the email address of the user. The email-relay website transmits the email message to the user, thereby providing the user with the resource locator 44 associated with the peripheral device 30. In another arrangement, the email message includes a hyperlink associated with the management interface 32. Execution of the hyperlink by the user on the user's computerized device causes the computer's web browser to launch the management interface 32 of the peripheral device 30.

As described above, to access the management interface 32 of a peripheral device 30, a user transmits an activation stimulus 36 to the peripheral device 30 through an activation source 34. In one situation, multiple users in a system 20 can simultaneously attempt to access the management interfaces 32 for multiple peripheral devices 30 in the system 20. In such a situation, as each activated peripheral device 30 broadcasts or wirelessly transmits a device message 40 corresponding to each respective activation stimulus 36, each activating user, via their respective receiving devices, receives all device messages 40 from all of the activated peripheral devices 30. In other words, each user receives the device message 40 corresponding to his transmitted activation stimulus and receives the device messages 40 corresponding to activation stimuli from other users in the system 20. In such a case, each user can encounter difficulty in identifying a device message 40 corresponding to his particular activation stimulus 36.

Figure 5:
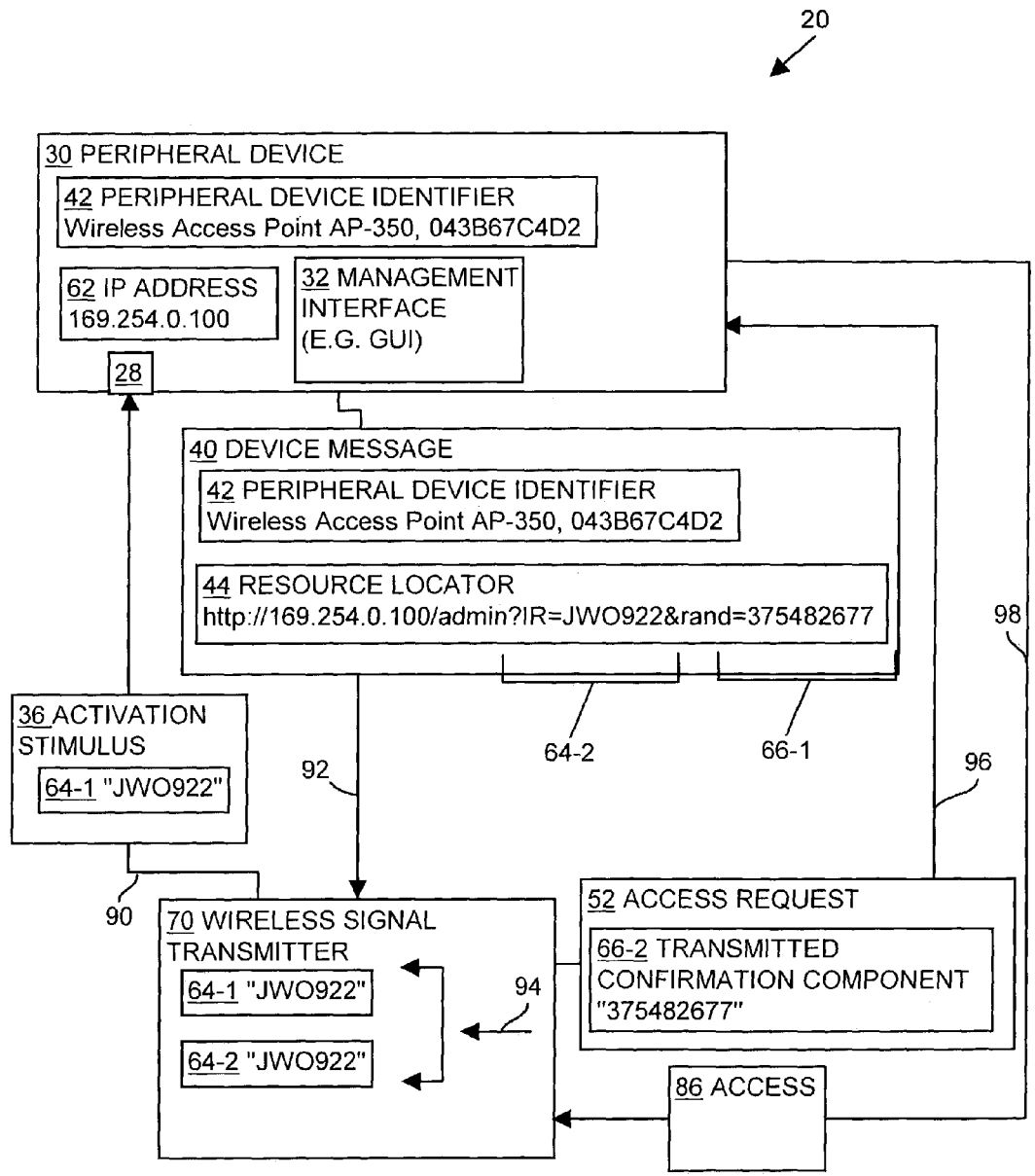
FIG. 5 is a block diagram of the computer system of FIG. 1, configured according to another embodiment of the invention.

FIG. 5 illustrates a wireless signal transmitter 70 utilizing an identification component 64 to confirm reception of a device message 40 from a particular or target peripheral device 30, transmitted in response to the user's transmitted activation stimulus 36.

As illustrated, the wireless signal transmitter 70 transmits 90 an activation stimulus 36 to the peripheral device 30, where the activation stimulus 36 has a transmitted identification component 64-1 indicating an identity of the wireless signal transmitter 70 (e.g., activation source). To initiate transmission of the activation stimulus 36 to the peripheral device 30, the user enters an identification component 64-1 into the transmitter 70 (e.g., "JWO922"), such as through a keypad. The activation source 34 incorporates the entered identification component 64-1 into the activation stimulus 36 and transmits the activation stimulus 36 having the identification component 64-1 (e.g., transmitted identification component) to the peripheral device 30.

In response to transmitting the activation stimulus 36, the wireless signal transmitter 70 receives 92 a device message 40 from the peripheral device 30. The device message 40 has a peripheral device identifier 42 indicating the identity (e.g., model number, MAC address) of the peripheral device 30 and a resource locator 44 that provides access to the management interface 32 associated with the peripheral device 30. The resource locator 44 includes a received identification component 64-2 indicating the identity of the wireless signal transmitter 70 for the activation stimulus 36. As described above, when the peripheral device 30 constructs the device message 40 in response to receiving the activation stimulus 36, the peripheral device 30 includes an identification component 64-2 within the resource locator 44, such as the component 64-1 received from the wireless signal transmitter 70.

Next, the wireless signal transmitter 70 detects 94 a correspondence between the transmitted identification component 64-1 and the received identification component 64-2. For example, the wireless signal transmitter 70 detects 94 that the transmitted identification component 64-1 "JWO922" is the same as the received identification component 64-2 "JWO922". Such correspondence indicates, to the wireless transmitter (e.g., user of the transmitter 70), that the device message 40 received by the wireless transmitter 70 corresponds is transmitted in response to the activation stimulus 36 provided by the wireless signal transmitter 70.

FIG. 5 further illustrates access of the management interface 32 by the wireless signal transmitter 70 using the confirmation component 66 provided by the peripheral device 30.

When the wireless signal transmitter 70 receives the device message 40, the device message 40 includes a confirmation component 66-1 (e.g., received confirmation component) as part of the resource locator 44. As described above, the peripheral device 30 generates the confirmation component 66 to confirm user access to the management interface 32 associated with the peripheral device 30.

In response to receiving the device message 40 from the peripheral device 30, the wireless signal transmitter 70 transmits 96 an access request 52 to the peripheral device 30 to retrieve the management interface 32 associated with the peripheral device 30. The receiver 48 includes, within the access request 52, the received confirmation component 66-1 (e.g., the string "375482677") as a transmitted confirmation component 66-2 to allow for verification, by the peripheral device 30, of the access request 52. The wireless signal transmitter 70 receives access 86 to the management interface 32 based upon a correspondence between the confirmation component 66-2 transmitted by the wireless signal transmitter 70 and the confirmation component 66-1 generated by the peripheral device 30. For example, the peripheral device 30 compares the transmitted confirmation component 66-2 (e.g., "375482677") with the generated confirmation component 66-1 (e.g., "375482677"). Based upon a detected correspondence between the confirmation components 66-1 and 66-2 by the peripheral device 30, the wireless signal transmitter 70 receives access 86 to the management interface 32. For example, such access involves the ability for the wireless signal transmitter 70 to launch the management interface 32 as a web-based GUI on a web browser associated with the wireless signal transmitter 70.

Figure 6:
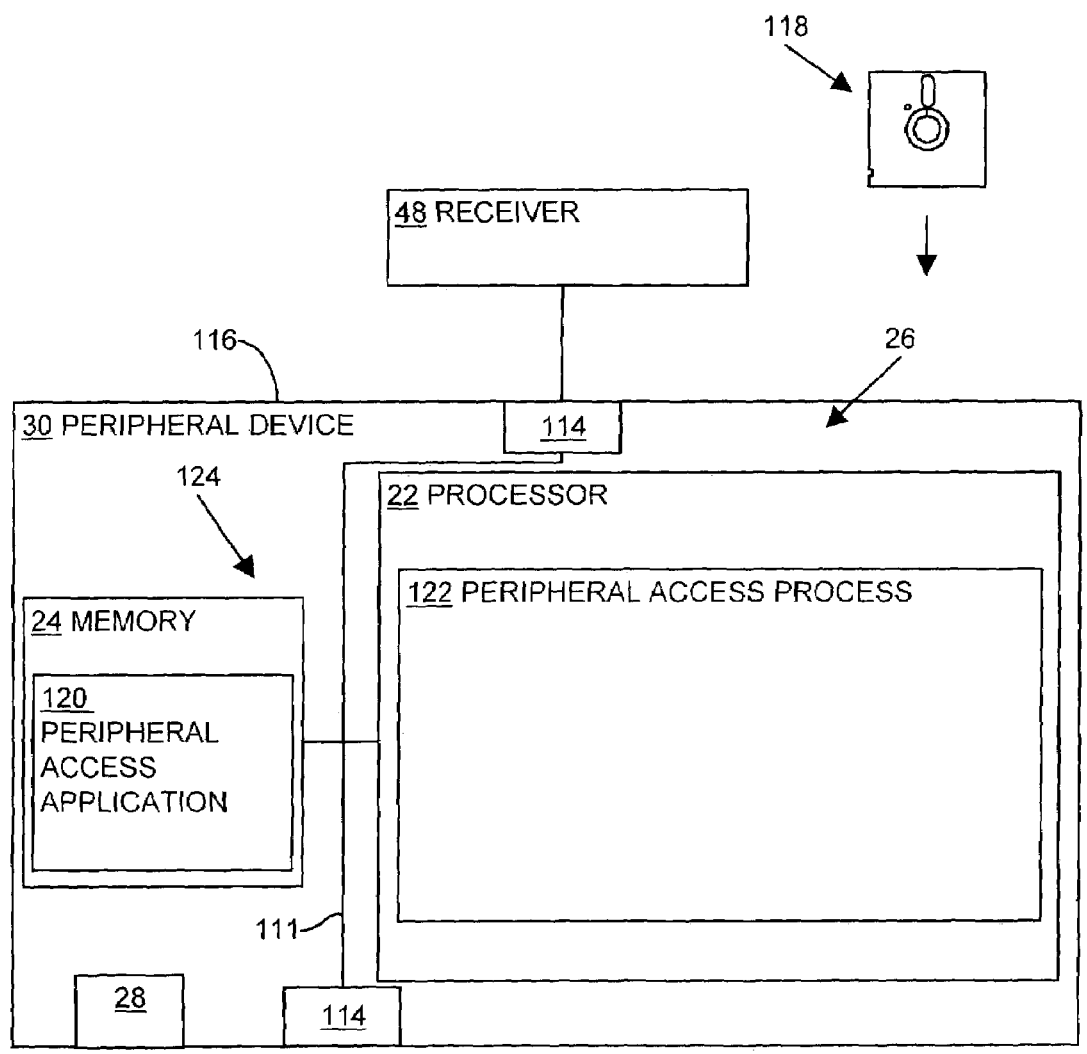
FIG. 6 is a block diagram of a computerized device, configured according to one embodiment of the invention.

FIG. 6 illustrates a more detailed architecture of a peripheral device 30, configured as a computerized device 116, according to one embodiment of the invention. A computer program product 118 includes an application or logic instructions, such as peripheral access instructions, that are loaded into the peripheral device 30 to configure the peripheral device 30 to provide access to a management interface associated with the peripheral device.

The peripheral device 30 in this embodiment of the invention includes an interconnection mechanism 111 such as a data bus and/or other circuitry that interconnects a controller 124, including a memory 24 and a processor 22, and one or more communications interfaces 114.

The memory 24 can be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 24 is encoded with logic instructions (e.g., software code) and/or data that form a peripheral access application 120 configured according to embodiments of the invention. In other words, the peripheral access application 120 represents software code, instructions and/or data that represent or convey the processing logic steps and operations as explained herein and that reside within memory or storage or within any computer readable medium accessible to the peripheral device 30.

The processor 22 represents any type of circuitry or processing device such as a central processing unit, microprocessor or application-specific integrated circuit that can access the peripheral access application 120 encoded within the memory 24 over the interconnection mechanism 111 in order to execute, run, interpret, operate or otherwise perform the peripheral access application 120 logic instructions. Doing so forms the peripheral access process 122. In other words, the peripheral access process 122 represents one or more portions of the logic instructions of the peripheral access application 120 while being executed or otherwise performed on, by, or in the processor 22 within the peripheral device 30.

In one arrangement, the communications interface 114 is a wireless signal interface (e.g., wireless signal transponder) that provides for reception and transmission of wireless signals. In another arrangement, the peripheral device 30 includes a mechanical activation interface 28, such as a switch or button. Actuation of the activation interface 28 causes the peripheral device 30 to create a device message 40 and transmit the device message 40 to a receiver 48 through the communications interface 114.

Those skilled in the art will understand that there can be many variations made to the embodiments explained above while still achieving the same objective of those embodiments and the invention in general.

As described above, a wireless signal transmitter 70 uses an identification component 64 to confirm reception of a device message 40 from a target peripheral device 30 transmitted in response to the user's transmitted activation stimulus 36. In another arrangement, the peripheral device is configured with an indicator or indicator light, such as an LED, that illuminates in response to reception of a wireless signal transmission. For example, assume a user transmits an activation stimulus 36, such as an IR signal, to a peripheral device 30 using a wireless signal transmitter 70. The activation stimulus 36, in turn, causes the indicator on the peripheral device 30 to illuminate. By viewing the illuminated indicator, the user can confirm activation of a target peripheral device 30 (e.g., peripheral device reception of the activation stimulus 36).

Also as described above, in response to receiving an activation stimulus 36, the peripheral device creates a device message 40 having a device identifier 42. The device indicator 42, as described above, includes a model name 42-1 and a MAC address 42-2. The model name 42-1 allows a receiving user to confirm reception of the device message 40 from a particular peripheral device 30 (e.g., the peripheral device 30 of interest to the user). In one arrangement, the device identifier 42 further includes a serial number associated with peripheral device 30. In the case where a computer system 20 has multiple peripheral devices 30 having identical model names 42-1, inclusion, within the device identifier 42, of the serial number associated with the peripheral device 30 further allows a user to distinguish a peripheral device 30 of interest (e.g., user activated peripheral device 30) within the system 20.

Also as described above, the peripheral device 30 has an activation interface 28 that receives an activation stimulus 36 from an activation source 34. As described, the activation interface 28 is a mechanical interface, such as a switch or button or is a wireless signal interface (e.g., wireless signal transponder) that provides for reception and transmission of wireless signals. In another arrangement, the peripheral device 30 is configured with both the mechanical interface and the wireless interface (e.g., IR signal receiver). Such configuration allows for both mechanical (e.g., physical) and wireless activation of the peripheral device 30.

As described above, after receiving an activation stimulus 36, the peripheral device 30 transmits, to a user, a device message 40 having a confirmation component 66 (e.g., randomly generated password). The peripheral device 30 transmits the message 40 as both a network broadcast and as a wireless signal transmission (e.g., a paired transmission) in response to a single triggering event (e.g., reception of the activation stimulus 36). In one arrangement, the confirmation component 66 transmitted via the network broadcast differs (e.g., is unique) from the confirmation component 66 transmitted via the wireless signal transmission. In such an arrangement, the peripheral device 30 generates or selects unique confirmation components 66 for each transmission type (e.g., broadcast and wireless) corresponding to the level of security necessary for the type of transmission.

Also as described above, the management interface 44 associated with a peripheral device 30 allows a user to control functions associated with the peripheral device. As described, the peripheral management interface 44 is a graphical user interface (GUI), such as a Web-based GUI associated with the peripheral device 30. Alternatively, the management interface 44 is a non-graphical interface, such as a command line interface.

Also as described above, the peripheral device 30 has a MAC address 42-2 and an IP address 62 that allows a user to establish communications with the peripheral device. Such description is by way of example only. Other peripheral device addressing schemes, such as the Classless Inter-Domain Routing (CIDR) addressing scheme are applicable to peripheral devices in communication with a network.

Also as described above, the peripheral device 30 has a management interface 32, such as a GUI, that allows a user to configure settings associated with the peripheral device 30 or to troubleshoot problems encountered with the peripheral device 30. In one arrangement, the management interface 32 resides or is embedded within the peripheral device 30. In another arrangement, the management interface 32 resides on a node (e.g., computerized device within the computer system 20 or network) external to and separate from the peripheral device 30. Such an arrangement allows user access for the peripheral management interface 32 associated with the peripheral device 30 for peripheral devices 30 that are not configured with the management interface 32 (e.g., for peripheral devices 30 that do not have an embedded web GUI).

Figure 7:
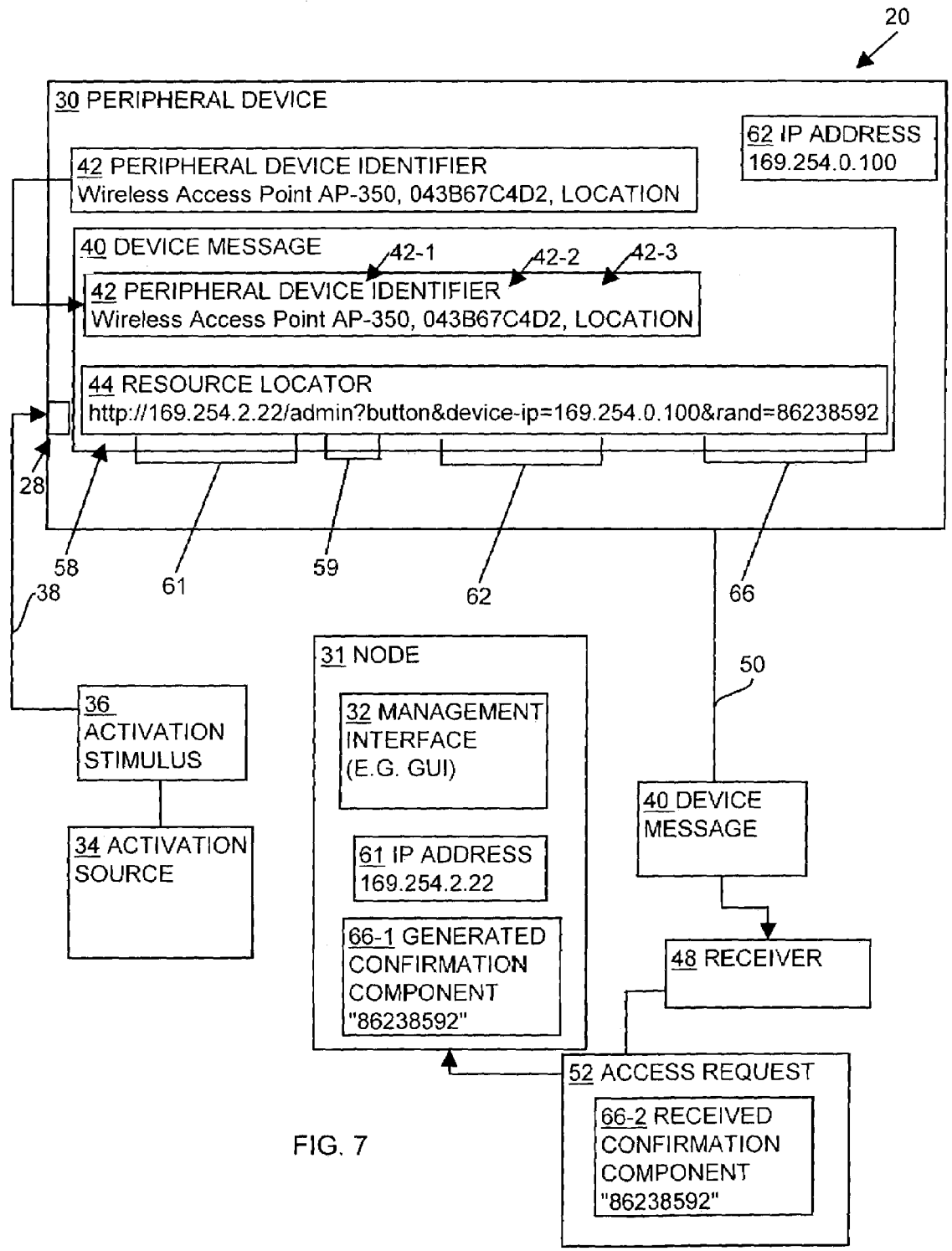
FIG. 7 is a block diagram of a computer system, configured according to another embodiment of the invention.

FIG. 7 illustrates a computer system 20 having a peripheral device 30 and a node 31 configured with (e.g., storing) the management interface 32 associated with the peripheral device 30. In response to an activation stimulus 36 the peripheral device transmits 50 the device message 40 to the receiver 48. The device message 40 has a resource locator 44 that references the IP address 61 of the node 31 configured with the management interface 32 (e.g., GUI) for the peripheral device 30. The resource locator 44 of the device message 40 also references the IP address 62 of the peripheral device 30 to allow identification of the peripheral device 30, by the receiver 48, among several peripheral devices 30 potentially managed by the node 31. The resource locator 44 also has a confirmation component 66 (e.g., randomly generated conformation component 66), as described above. The peripheral device 30 transmits the device message 40 to the receiver 48. The receiver 48 receives the confirmation component 66 as a received confirmation component 66-2.

The node 31 provides access control for the management interface 32 with respect to requesting users or receivers 38. The peripheral device 30, therefore, transmits the confirmation component 66 to the node 31 as a generated confirmation component 66-1. When the receiver 48 transmits 54 an access request 52 to the node 41, where the access request 52 includes the received confirmation component 66-2, the node 31 detects a correspondence between the generated confirmation component 66-1 and the received confirmation component 66-2. Based upon the detected correspondence 84 between the received confirmation component 66-2 and the generated confirmation component 66-1, the node provides receiver 48 access to the management interface 32.

Such variations are intended to be covered by the scope of this invention. As such, the foregoing description of embodiments of the invention is not intended to be limiting. Rather, any limitations to the invention are presented in the following claims.

What is claimed is:

1. In a peripheral device associated with a host computer, a method for providing access to a management interface associated with the peripheral device, comprising the steps of:
    receiving a non-web based activation stimulus from an activation source through an activation interface;
    preparing a device message in response to receiving the activation stimulus, the device message having
    (i) a peripheral device identifier and
    (ii) a resource locator that provides access to the management interface associated with the peripheral device; and
    transmitting the device message to a receiver, the resource locator of the device message providing access to the management interface associated with the peripheral device;
    wherein:
    preparing the device message comprises preparing the device message in response to receiving the activation stimulus, the device message having
    (i) a model name and media access control (MAC) address of the peripheral device, and
    (ii) a uniform resource locator (URL) that provides an Internet Protocol (IP) address of the management interface associated with the peripheral device; and
    transmitting the device message comprises broadcasting the device message as a network broadcast over a local area network (LAN) to the receiver, the uniform resource locator of the device message providing access to the management interface associated with the peripheral device.

2. The method of claim 1 wherein the step of preparing comprises the step of preparing the device message having the resource locator that provides access to the management interface, the resource locator having an identification component indicating the identity of the activation source for the activation stimulus.

3. The method of claim 1 further comprising the step of generating a confirmation component in response to receiving the activation stimulus, the confirmation component allowing verification of an access request for the management interface and wherein the step of preparing comprises the step of preparing the device message having the resource locator that provides access to the management interface, the resource locator having the generated confirmation component.

4. The method of claim 3 further comprising the steps of:
    receiving an access request for the management interface, the access request having the confirmation component;
    comparing the received confirmation component with the generated confirmation component; and
    providing access to the management interface based upon a correspondence between the received confirmation component and the generated confirmation component.

5. The method of claim 1 wherein:
    the step of receiving comprises the step of receiving, through the activation interface, the activation stimulus as a wireless signal provided by a wireless signal transmitter, the wireless signal having a destination locator associated with a receiver; and
    the step of transmitting comprises posting the device message at destination locator of the receiver.

6. The method of claim 1 wherein:
    the step of receiving comprises the step of receiving, through the activation interface, the activation stimulus as a wireless signal provided by a wireless signal transmitter; and
    the step of transmitting comprises the step of broadcasting the device message through the network to a receiver in communication with the network.

7. The method of claim 1 wherein:
    the step of receiving comprises the step of receiving, through the activation interface, the activation stimulus as a wireless signal provided by a wireless signal transmitter; and
    the step of transmitting comprises the step of transmitting the device message as a wireless signal to the wireless signal transmitter.

8. The method of claim 1 wherein the step of receiving comprises the step of receiving, through the activation interface, the activation stimulus as a mechanical actuation of the activation interface.

9. The method of claim 3, wherein generating the confirmation component in response to receiving the activation stimulus comprises generating a random string as the confirmation component in response to receiving the activation stimulus, the confirmation component allowing verification of an access request for the management interface and wherein the step of preparing comprises the step of preparing the device message having the resource locator that provides access to the management interface, the resource locator having the generated confirmation component.

10. The method of claim 5, wherein:
receiving comprises receiving, through the activation interface, the activation stimulus as the wireless signal provided by the wireless signal transmitter, the wireless signal having an IP address associated with the receiver; and
transmitting comprises transmitting the device message to a location associated with the IP address associated with the receiver.

11. A computerized device comprising:
at least one communications interface;
a controller; and
an interconnection mechanism coupling the at least one communications interface and the controller;
wherein the computerized device is configured to:
receive a non-web based activation stimulus from an activation source through an activation interface;
prepare a device message in response to receiving the activation stimulus, the device message having
(i) a peripheral device identifier and
(ii) a resource locator that provides access to the management interface associated with the peripheral device; and
transmit, through the communications interface, the device message to a receiver, the resource locator of the device message providing access to the management interface associated with the peripheral device;
wherein:
when preparing the device message the computerized device is configured to prepare the device message in response to receiving the activation stimulus, the device message having
(i) a model name and media access control (MAC) address of the peripheral device, and
(ii) a uniform resource locator (URL) that provides an Internet Protocol (IP) address of the management interface associated with the peripheral device; and
when transmitting the device message the computerized device is configured to broadcast the device message as a network broadcast over a local area network (LAN) to the receiver, the uniform resource locator of the device message providing access to the management interface associated with the peripheral device.

12. The computerized device of claim 11 wherein the computerized device, when preparing, is configured to prepare the device message having the resource locator that provides access to the management interface, the resource locator having an identification component indicating the identity of the activation source for the activation stimulus.

13. The computerized device of claim 11 wherein the computerized device is configured to generate a confirmation component in response to receiving the activation stimulus, the confirmation component allowing verification of an access request for the management interface and wherein, when preparing, the computerized device is further configured to prepare a device message having a resource locator for providing access to the management interface, the resource locator having the confirmation component.

14. The computerized device of claim 11 wherein the computerized device is further configured to:
receive, through the communications interface, an access request for the management interface, the access request having the confirmation component;
compare the received confirmation component with the generated confirmation component; and
provide access to the management interface based upon a correspondence between the received confirmation component and the generated confirmation component.

15. The computerized device of claim 11 wherein the computerized device is configured to:
when receiving, receive the activation stimulus, through the activation interface, as a wireless signal provided by a wireless signal transmitter, the wireless signal having a destination locator associated with a receiver; and
when transmitting, post the device message at destination locator of the receiver.

16. The computerized device of claim 11 wherein the computerized device is configured to:
when receiving, receive the activation stimulus, through the activation interface, as a wireless signal provided by a wireless signal transmitter; and
when transmitting, broadcast the device message through the network to a receiver in communication with the network.

17. The computerized device of claim 11 wherein the computerized device is configured to:
when receiving, receive the activation stimulus, through the activation interface, as a wireless signal provided by a wireless signal transmitter; and
when transmitting, transmit the device message as a wireless signal to the wireless signal transmitter.

18. The computerized device of claim 11 wherein the computerized device is configured to:
when receiving, receive, through the activation interface, the activation stimulus as a mechanical actuation of the activation interface.

19. A computer program product having a computer-readable medium including computer program logic encoded thereon that, when performed on a controller in a computerized device having a coupling to at least one communications interface provides a method for performing the operations of:
receiving a non-web based activation stimulus from an activation source through an activation interface;
preparing a device message in response to receiving the activation stimulus, the device message having
(i) a peripheral device identifier and
(ii) a resource locator that provides access to the management interface associated with the peripheral device; and
transmitting, through the communications interface, the device message to a receiver, the resource locator of the device message providing access to the management interface associated with the peripheral device;
wherein:
preparing the device message comprises preparing the device message in response to receiving the activation stimulus, the device message having
(i) a model name and media access control (MAC) address of the peripheral device, and
(ii) a uniform resource locator (URL) that provides an Internet Protocol (IP) address of the management interface associated with the peripheral device; and
transmitting the device message comprises broadcasting the device message as a network broadcast over a local area network (LAN) to the receiver, the uniform resource locator of the device message providing access to the management interface associated with the peripheral device.

20. A computerized device comprising:

at least one communications interface;

a controller; and an interconnection mechanism coupling the at least one communications interface and the controller;

wherein the computerized device is configured to produce a means for providing access to a management interface associated with the computerized device, such means including:

means for receiving a non-web based activation stimulus from an activation source through an activation interface;

means for preparing a device message in response to receiving the activation stimulus, the device message having (i) a peripheral device identifier and (ii) a resource locator that provides access to the management interface associated with the peripheral device; and means for transmitting, through the communications interface, the device message to a receiver, the resource locator of the device message providing access to the management interface associated with the peripheral device;

wherein:

means for preparing the device message comprises means for preparing the device message in response to receiving the activation stimulus, the device message having (i) a model name and media access control (MAC) address of the peripheral device, and (ii) a uniform resource locator (URL) that provides an Internet Protocol (IP) address of the management interface associated with the peripheral device; and means for transmitting the device message comprises means for broadcasting the device message as a network broadcast over a local area network (LAN) to the receiver, the uniform resource locator of the device message providing access to the management interface associated with the peripheral device.

21. In an activation source associated with a peripheral device, a method for accessing a management interface associated with the peripheral device, comprising the steps of:

transmitting a non-web based activation stimulus to the peripheral device through an activation interface associated with the peripheral device, the activation stimulus having a transmitted identification component indicating an identity of the activation source;

receiving a device message from the peripheral device, the device message having a peripheral device identifier indicating the identity of the peripheral device and a resource locator that provides access to the management interface associated with the peripheral device, the resource locator having a received identification component indicating the identity of the activation source for the activation stimulus; and detecting a correspondence between the transmitted identification component and the received identification component;

wherein receiving the device message from the peripheral device comprises receiving the device message from the peripheral device, the device message having the peripheral device identifier indicating the identity of the peripheral device and a resource locator that provides access to the management interface associated with the peripheral device, the peripheral device identifier having a model name and media access control (MAC) address of the peripheral device, and the resource locator having a uniform resource locator (URL) that provides an Internet Protocol (IP) address of the management interface associated with the peripheral device and a received identification component indicating the identity of the activation source for the activation stimulus.

22. The method of claim 21 wherein the step of receiving further comprises receiving the device message generated by the peripheral device, the device message having a confirmation component, generated by the peripheral device, allowing user access to the management interface and further comprising the steps of:

transmitting, to the peripheral device, an access request for the management interface, the access request having the received confirmation component; and receiving access to the management interface based upon a correspondence between the confirmation component transmitted by the activation source and the confirmation component generated by the peripheral device.

23. A computerized device comprising:

at least one communications interface;

a controller; and an interconnection mechanism coupling the at least one communications interface and the controller;

wherein the computerized device is configured to:

transmit a non-web based activation stimulus to the peripheral device through an activation interface associated with the peripheral device, the activation stimulus having a transmitted identification component indicating an identity of the activation source;

receive, through the communications interface, a device message from the peripheral device, the device message having a peripheral device identifier indicating the identity of the peripheral device and a resource locator that provides access to the management interface associated with the peripheral device, the resource locator having a received identification component indicating the identity of the activation source for the activation stimulus; and detect a correspondence between the transmitted identification component and the received identification component;

wherein when receiving the device message from the peripheral device the computerized device is configured to receive the device message from the peripheral device, the device message having the peripheral device identifier indicating the identity of the peripheral device and a resource locator that provides access to the management interface associated with the peripheral device, the peripheral device identifier having a model name and media access control (MAC) address of the peripheral device, and the resource locator having a uniform resource locator (URL) that provides an Internet Protocol (IP) address of the management interface associated with the peripheral device and a received identification component indicating the identity of the activation source for the activation stimulus.

24. The computerized device of claim 23 wherein the computerized device, when receiving, is further configured to receive a device message generated by the peripheral device, the device message having a confirmation component, generated by the peripheral device, allowing user access to the management interface and wherein the computerized device is further configured to:

transmit, to the peripheral device through the communications interface, an access request for the management interface, the access request having the received confirmation component; and receive access to the management interface based upon a correspondence between the confirmation component transmitted by the activation source and the confirmation component generated by the peripheral device.

25. A computer program product having a computer-readable medium including computer program logic encoded thereon that, when performed on a controller in a computerized device having a coupling to at least one communications interface provides a method for performing the operations of:

transmit a non-web based activation stimulus to the peripheral device through an activation interface associated with the peripheral device, the activation stimulus having a transmitted identification component indicating an identity of the activation source;

receive, through the communications interface, a device message from the peripheral device, the device message having a peripheral device identifier indicating the identity of the peripheral device and a resource locator that provides access to the management interface associated with the peripheral device, the resource locator having a received identification component indicating the identity of the activation source for the activation stimulus; and detect a correspondence between the transmitted identification component and the received identification component;

when receiving the device message from the peripheral device, receive the device message from the peripheral device, the device message having the peripheral device identifier indicating the identity of the peripheral device and a resource locator that provides access to the management interface associated with the peripheral device, the peripheral device identifier having a model name and media access control (MAC) address of the peripheral device, and the resource locator having a uniform resource locator (URL) that provides an Internet Protocol (IP) address of the management interface associated with the peripheral device and a received identification component indicating the identity of the activation source for the activation stimulus.

26. A computerized device comprising:

at least one communications interface;

a controller; and an interconnection mechanism coupling the at least one communications interface and the controller;

wherein the computerized device is configured to produce a means for accessing a management interface associated with the peripheral device, such means including:

means for transmitting a non-web based activation stimulus to the peripheral device through an activation interface associated with the peripheral device, the activation stimulus having a transmitted identification component indicating an identity of the activation source;

means for receiving, through the communications interface, a device message from the peripheral device, the device message having a peripheral device identifier indicating the identity of the peripheral device and a resource locator that provides access to the management interface associated with the peripheral device, the resource locator having a received identification component indicating the identity of the activation source for the activation stimulus; and means for detecting a correspondence between the transmitted identification component and the received identification component;

wherein means for receiving the device message from the peripheral device comprises means for receiving the device message from the peripheral device, the device message having the peripheral device identifier indicating the identity of the peripheral device and a resource locator that provides access to the management interface associated with the peripheral device, the peripheral device identifier having a model name and media access control (MAC) address of the peripheral device, and the resource locator having a uniform resource locator (URL) that provides an Internet Protocol (IP) address of the management interface associated with the peripheral device and a received identification component indicating the identity of the activation source for the activation stimulus.

* * * * *